(12) United States Patent
Ishimura et al.

(10) Patent No.: US 7,266,630 B2
(45) Date of Patent: Sep. 4, 2007

(54) CPU CONTAINED LSI (75) Inventors: Isamu Ishimura, Kyoto (JP); Shinobu Machida, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 188 days.

(21) Appl. No.: 10/735,630

(22) Filed: Dec. 16, 2003

(65) Prior Publication Data
US 2004/0128417 A1   Jul. 1, 2004

(30) Foreign Application Priority Data
Dec. 16, 2002   (JP)   ............... P. 2002-364231

(51) Int. Cl.
G06F 13/36   (2006.01)
(52) U.S. Cl. ............................... 710/309; 710/240
(58) Field of Classification Search ............... 710/10, 710/52–57, 300–302, 107, 110, 113, 114, 710/116, 305–315, 240, 241, 244
See application file for complete search history.

(56) References Cited

U.S. PATENT DOCUMENTS

| | | | | |
|---|---|---|---|---|
| 4,989,135 A * | 1/1991 | Miki | ............... | 710/22 |
| 5,392,436 A * | 2/1995 | Jansen et al. | ............... | 710/113 |
| 5,448,743 A * | 9/1995 | Gulick et al. | ............... | 710/49 |
| 5,870,560 A * | 2/1999 | Zulian | ............... | 709/225 |
| 5,890,210 A * | 3/1999 | Ishii et al. | ............... | 711/113 |
| 5,933,613 A * | 8/1999 | Tanaka et al. | ............... | 710/314 |
| 6,180,864 B1 * | 1/2001 | Furuhashi et al. | ............... | 84/603 |
| 6,427,181 B1 * | 7/2002 | Furuhashi | ............... | 710/300 |
| 6,457,144 B1 * | 9/2002 | Eberhard | ............... | 714/45 |
| 6,532,507 B1 * | 3/2003 | Falik et al. | ............... | 710/107 |
| 6,845,419 B1 * | 1/2005 | Moyer | ............... | 710/264 |
| 2001/0052070 A1 * | 12/2001 | Oishi et al. | ............... | 713/151 |

FOREIGN PATENT DOCUMENTS

| | | |
|---|---|---|
| JP | 59-75354 A | 4/1984 |
| JP | 61-72352 A | 4/1986 |
| JP | 61-241856 A | 10/1986 |
| JP | 62-37760 A | 2/1987 |
| JP | 62-134746 A | 6/1987 |
| JP | 1-177664 A | 7/1989 |
| JP | 1-205257 A | 8/1989 |

(Continued)

*Primary Examiner*—Glenn A. Auve
*Assistant Examiner*—Trisha Vu
(74) *Attorney, Agent, or Firm*—McDermott Will & Emery LLP (57) ABSTRACT

In a system in which a CPU contained LSI and an external CPU share a bus, when the external CPU accesses a device to be controlled which is connected to a bus, the access to a device mounted on the common bus is not prevented in the CPU contained LSI. A CPU contained LSI includes a CPUa, common address/data buses 111 and 112 connected to the CPUa, CPUb address/data buses 211 and 212 connected to a CPUb, and a bus adjusting circuit 105 disposed between the common address/data buses and the CPUb address/data buses to exclusively control accesses from the CPUa and the CPUb to a device connected to the common address/data buses and connect the CPUb adress/data buses to the common address/data buses only when the CPUb is permitted to access the device connected to the common address/data buses.

8 Claims, 6 Drawing Sheets

FOREIGN PATENT DOCUMENTS

| | | |
|---|---|---|
| JP | 5-282246 | 10/1993 |
| JP | 7-121500 A | 5/1995 |
| JP | 10-134008 A | 5/1998 |
| JP | 11-96105 A | 4/1999 |
| JP | 2000-181699 A | 6/2000 |
| JP | 2002-91935 A | 3/2002 |

* cited by examiner

CPU CONTAINED LSI

BACKGROUND OF THE INVENTION

1. Field of the Invention

The present invention relates to a CPU contained LSI having a bus control function in a system configuration that a contained CPU and an external CPU access a common bus.

2. Description of the Related Art

In recent years, a system LSI has been complicated and large-scaled. Software for controlling the system LSI has been also progressively complicated and large-scaled. Accordingly, when a function for realizing the system LSI is mounted on a set of goods, the increase of the number of mounting steps of the software is the most serious problem.

Thus, a method that a CPU is contained in the system LSI and the control software of the system LSI is executed by the contained CPU to hide a complicated software process in the system LSI has been currently carried out. This method has been frequently used in the system LSI having interface systems which substantially serve as post-functions such as a USB, an IEEE1394, etc.

When the above-described CPU contained system LSI is mounted on a system of a set of goods, a communication between a CPU existing in the system of the set of goods and the contained CPU is necessary. A communication method is roughly classified into a method by a serial bus connection and a method of sharing a bus by parallel buses. When the communication of a large quantity of data is carried out, the bus sharing by the parallel buses is frequently employed to share a memory from the viewpoint of communication speed.

Figure 6:
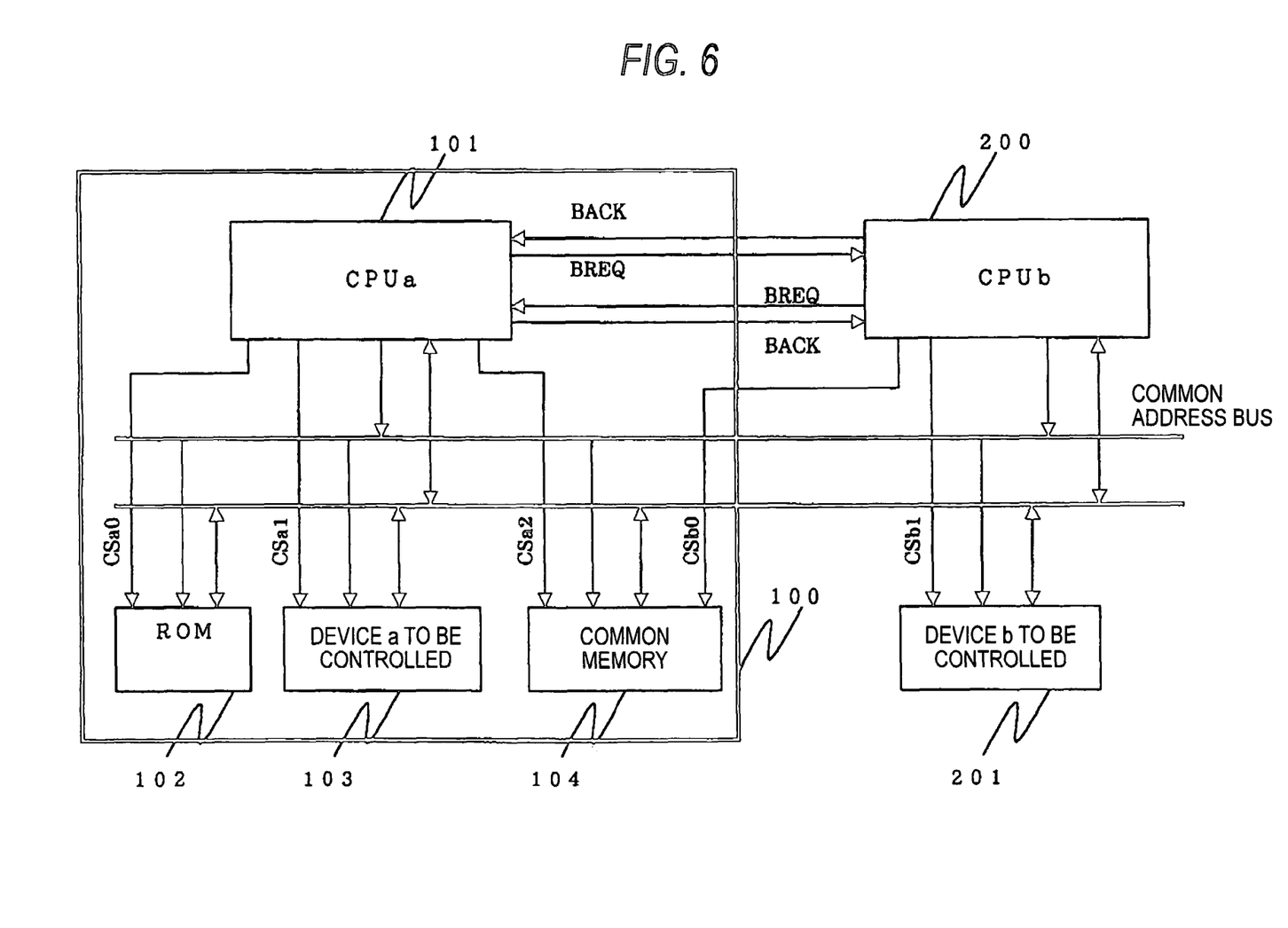
FIG. 6 is a block diagram showing the structure of a usual system having two CPUs which share a bus.

Now, referring to FIG. 6, the structure of an existing system that two CPUs share an external expansion bus to share a memory and realize a data communication will be described. As shown in FIG. 6, the system comprises a CPU contained LSI 100, a CPUb 200 and a device b201 to be controlled that is controlled by the CPUb. Further, the CPU contained LSI 100 includes a CPUa 101, a ROM 102 for storing processing programs of the CPUa, a device a 103 to be controlled that is controlled by the CPUa and a common memory 104 for carrying out a data communication between the CPUa and the CPUb.

The CPUb 200 is designed to control two devices of the device b201 to be controlled and the CPU contained system LSI 100 via an externally expanded address bus/data bus. When the CPU contained system LSI 100 is controlled, the CPU contained LSI 100 is controlled via the common memory 104.

The CPUa 101 shares the externally expanded address bus/data bus together with the CPUb 200 and reads out a processing program from the ROM 102 via this common bus. While the CPUa 101 executes the processing program, the CPUa 101 controls the device a 103 to be controlled and receives a control from the CPUb 200 via the common memory 104.

Further, the CPUa 101 and the CPUb 200 respectively have bus adjusting functions. When the CPUb 200 accesses the device b201 to be controlled or the common memory 104 by using the common bus, the CPUb 200 obtains a right for using the bus to access them in the following procedure.

(1) The CPUb 200 asserts a bus release request signal BREQ to the CPUa 101.

(2) The CPUa 101 stops an access to the common bus to assert a bus release completion signal BACK to the CPUb 200.

(3) When the CPUb 200 completes the access to the device b201 to be controlled or the common memory 104, the CPUb 200 negates the BREQ signal to the CPUa 101.

(4) After the CPUa 101 recognizes the negation of the BREQ signal, the CPUa 101 negates the BACK signal.

When the CPUa uses the common bus to access the ROM 102, the device a 103 to be controlled and the common memory 104, the CPUa sends a bus release request signal BREQ to the CPUb 200. Then, the CPUa obtains a right for using the bus and performs the same processes as those described above.

A bus adjustment for obtaining the right for using the common bus in the system that a plurality of CPUs shares the bus has a problem of priority control. Accordingly, various kinds of systems have been hitherto proposed. For example, in the publication described in JP-A-5-282246, request/permission signals of rights for using a bus by a plurality of CPUs are connected together in a ring form to exclude a fixed priority control.

However, in the structure of the above-described conventional system, the CPUa 101 ordinarily reads the processing program from the ROM 102 and executes the program. However, in this case, every time the CPUb 200 accesses the device b201 to be controlled or the common memory 104, the CPUb 200 uses the common bus, so that the CPUa 101 cannot access the ROM 102 and the CPUa 101 needs to stop a process. As a result, the processing efficiency of the CPUa 101 is disadvantageously seriously lowered.

Further, to control the CPU contained LSI 100 by the CPUb 200, the CPUb 200 needs to have the bus adjusting function using the BREQ signal and the BACK signal. Further, a selection range of the kinds of the CPUb 200 is inconveniently limited.

When the CPUb 200 is a microcomputer for entirely controlling the system, for instance, when the CPU contained system LSI 100 is the system LSI having a post-attached interface system, the operation of the CPUb 200 for controlling the entire part is frequently desired to be carried out more preferentially than that of the CPUa 101.

In the conventional structure, however, since the CPUa 101 and the CPUb 200 have the equal right to the bus, when the CPUa 101 accesses the common bus during the operation of the CPUb 200, an interruption is generated Accordingly, the CPUb 200 cannot entirely control the system and a processing efficiency as the set of goods is inconveniently deteriorated.

SUMMARY OF THE INVENTION

The present invention was proposed by taking the above-described circumstances into consideration and it is a first object of the present invention to provide a CPU contained LSI having a mechanism in which when a device constantly used respectively by CPUs is connected to a bus, the CPUs can respectively access or control at the same time the device constantly used by them in a system that the CPU contained LSI shares the bus with other CPU and to improve the processing efficiency of the system.

Further, it is a second object of the present invention to provide a CPU contained system LSI in which other CPU can be controlled via a common bus in a system that the CPU contained LSI shares the bus with other CPU having no bus adjusting circuit. Further, it is a third object of the present invention to preferentially operate a specific CPU.

To solve the above-described problems, a CPU contained LSI of the present invention defined in claim 1 comprises: a contained CPU; a first bus connected to the contained CPU;

a second bus connected to an external CPU; and a bus adjusting circuit disposed between the first bus and the second bus to exclusively control accesses from the external CPU and the contained CPU to a device connected to the first bus and connect the second bus to the first bus only when the external CPU is permitted to access the device connected to the first bus.

According to the above-described structure, the first bus connected to the contained CPU is separated from the second bus connected to the external CPU by the bus adjusting circuit disposed between both the CPUs. The contained CPU and the external CPU share the device connected to the first bus under the exclusive access control of the bus adjusting circuit. The contained CPU can access the device connected to the first bus even during the access to the device connected to the second bus by the external CPU. Therefore, the processing efficiency of the system is not lowered.

According to the invention defined in claim 2, in the CPU contained LSI according to claim 1, when an access request to the device connected to the first bus from the external CPU is generated during an access to the device connected to the first bus by the contained CPU, the bus adjusting circuit transmits a bus release request signal to the contained CPU and transmits a wait signal to the external CPU, and when the bus adjusting circuit receives a bus release completion signal from the contained CPU, the bus adjusting circuit releases the wait signal to permit the external CPU to access the device connected to the first bus.

According to the above-described structure, the bus adjusting circuit has not only an adjusting control function using the bus release request signal and the bus release completion signal, but also an adjusting function using the wait signal. Thus, even when the external CPU does not have the bus adjusting function, a bus adjustment can be realized and the external CPU can operate preferentially to the contained CPU. Accordingly, especially when the external CPU entirely controls the system, the external CPU can suppress an influence applied to the deterioration of a performance of all the system to a minimum.

According to the invention defined in claim 3, in the CPU contained LSI according to claim 2, when the stop of the operation of the contained CPU is set, the bus adjusting circuit permits the external CPU to access the device connected to the first bus without transmitting the bus release request signal to the contained CPU.

According to the above-described structure, when the stop of the operation of the contained CPU is set, the bus adjusting circuit can skip a step of waiting for the bus release completion signal from the contained CPU to permit an access from the external CPU. Thus, for instance, even in a processing program prepared for the system LSI having no contained CPU, the use of the external CPU makes it possible to operate the LSI. Accordingly, the compatibility of the processing program can be enhanced.

According to the invention defined in claim 4, in the CPU contained LSI according to any one of claims 1 to 3, a common memory connected to the first bus is provided.

According to the above-described structure, the external CPU can access the common memory without feeling the existence of the bus adjusting circuit to control the CPU contained system LSI under the exclusive access control of the bus adjusting circuit. While the influence to the deterioration of the performance of all the system is suppressed to a minimum, a data communication can be performed between the contained CPU and the external CPU by using the common memory.

According to the invention defined in claim 5, in the CPU contained LSI according to any one of claims 1 to 4, a memory device connected to the first bus is provided for storing a program for operating the CPU contained LSI.

According to the above-described structure, even while the external CPU accesses the device connected to the second bus, the contained CPU can read and execute a program from the memory device connected to the first bus. Accordingly, a problem that the processing efficiency of the contained CPU is lowered does not arise.

According to the invention defined in claim 6, in the CPU contained LSI according to any one of claims 1 to 5, the bus adjusting circuit is provided with an interrupt control circuit for informing of an interruption between the contained CPU and the external CPU.

According to the above-described structure, since the bus adjusting circuit is provided with the interrupt control circuit, the bus adjusting circuit can inform of the interruption concerning the use of the first bus shared by the contained CPU and the external CPU. For instance, the bus adjusting circuit can use the interrupt control circuit for informing of the completion of writing in the common memory.

According to the invention defined in claim 7, in the CPU contained LSI according to claim 6, the interrupt control circuit includes an interrupt factor register having a plurality of bits in which the allocation and setting of bits of an interrupt factor are programmable and a circuit for outputting the bit OR of the interrupt factor register as an interrupt signal.

According to the above-described structure, since the interrupt factor register in which the allocation and setting of bits of the interrupt factor are programmable is provided, a programmer can freely allocate the bit to the interrupt factor to improve the degree of freedom of a processing program.

According to the invention defined in claim 8, in the CPU contained LSI according to claim 5, the memory device connected to the first bus is a RAM and when the CPU contained LSI is started, the external CPU loads the RAM with a program for operating the contained CPU from an external memory connected to the second bus.

According to the above-described structure, since the memory device for storing the program for operating the CPU contained LSI is the RAM, a risk that the program becomes a ROM can be avoided and the processing speed of the contained CPU can be improved. Further, the external CPU and the contained CPU share a flash ROM, so that the cost of all the system can be reduced.

According to the invention defined in claim 9, in the CPU contained LSI according to claim 8, the bus adjusting circuit includes a writing address register and a writing data register. When the external CPU loads the RAM with the program for operating the contained CPU, the external CPU sets the address of the RAM to the writing address register and writes data to be written in the RAM in the writing data register.

According to the above-described structure, when the external CPU loads the RAM with the program, the external CPU writes the data in the RAM and the address designating register and the data register. Accordingly, as an address to be designated and accessed from the external CPU, the address of the register may be designated. Therefore, a memory space to be accessed from the external CPU can be reduced and the number of terminals of an address bus between the CPU contained LSI and the external CPU can be reduced.

According to the invention defined in claim 10, in the CPU contained LSI according to claim 9, the writing address register is incremented every time data is written in the writing data register.

According to the above-described structure, every time the data is written in the writing data register, the writing address register is incremented. Accordingly, when the program is written in continuous addresses of the RAM, the address designating register does not need to be rewritten every time.

According to the invention defined in claim 11, a CPU contained LSI comprises: a first contained CPU; a second contained CPU; a first bus connected to the first contained CPU; a second bus connected to the second contained CPU; and a bus adjusting circuit disposed between the first bus and the second bus to exclusively control accesses of the second contained CPU and the first contained CPU to a device connected to the first bus and connect the second bus to the first bus only when the second contained CPU is permitted to access the device connected to the first bus.

According to the above-described structure, the first bus connected to the first contained CPU is separated from the second bus connected to the second contained CPU by the bus adjusting circuit disposed between both the CPUs. The first contained CPU and the second contained CPU share the device connected to the first bus under the exclusive access control of the bus adjusting circuit. The first contained CPU can access the device connected to the first bus even during the access to the device connected to the second bus by the second contained CPU. Therefore, the CPU contained LSI in which the processing efficiency of the system is not lowered can be obtained.

DESCRIPTION OF THE PREFERRED EMBODIMENTS

Now, referring to the drawings, embodiments of the present invention will be described in detail, however, the technical range of the present invention is not limited thereto.

Figure 1:
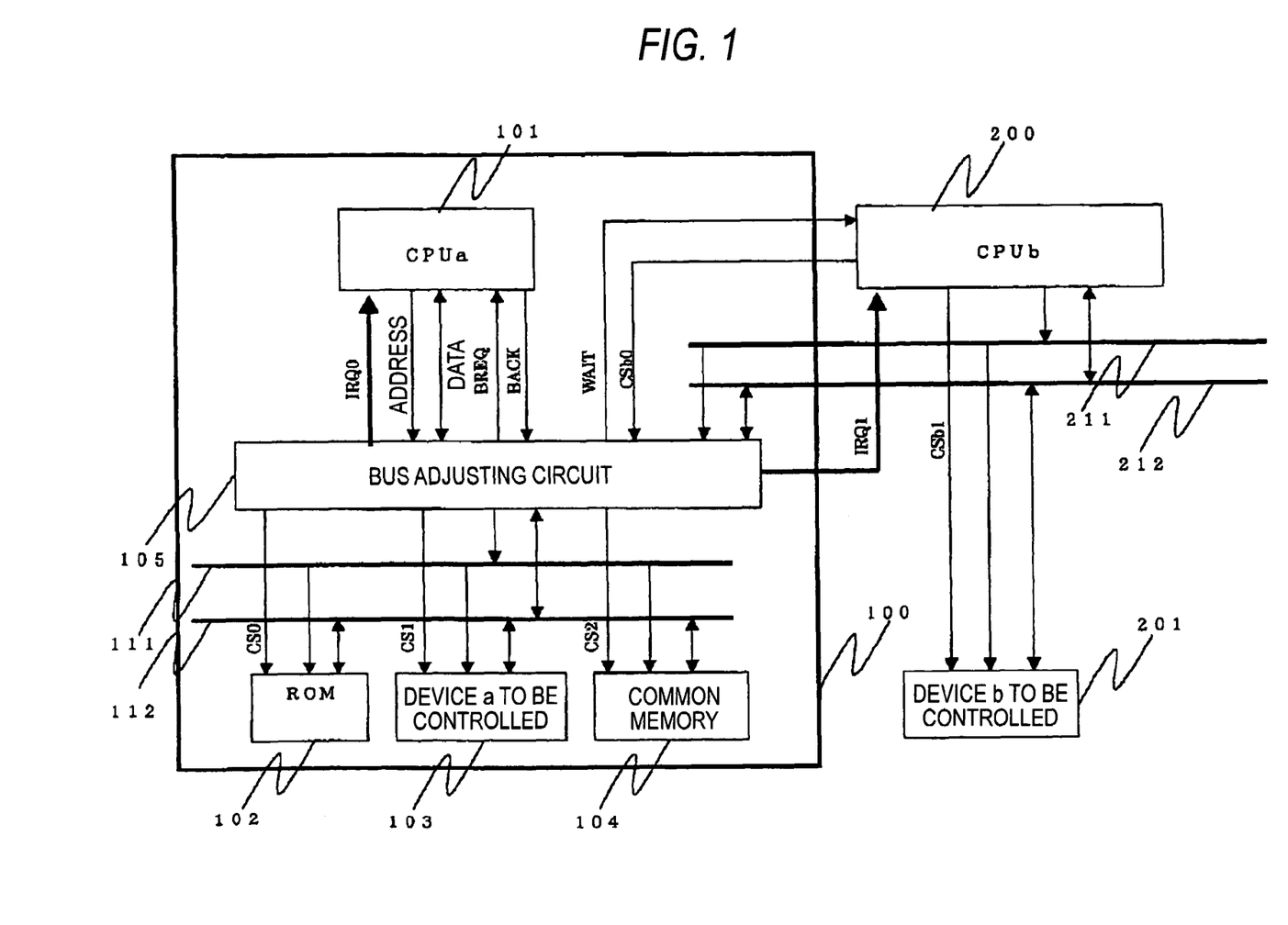
FIG. 1 is a block diagram showing the structure of a system using a CPU contained LSI according to a first embodiment of the present invention.

FIG. 1 is a block diagram showing the structure of a system using a CPU contained LSI according to a first embodiment of the present invention. In FIG. 1, the system comprises a CPU contained LSI 100, a CPUb 200 and a device b201 to be controlled that is controlled by the CPUb. Further, the CPU contained LSI 100 includes a CPUa 101, a ROM 102 for storing processing programs of the CPUa, a device a 103 to be controlled that is controlled by the CPUa and a common memory 104 for carrying out a data communication between the CPUa and the CPUb and a bus adjusting circuit 105.

The CPUb 200 is designed to control two devices of the device b201 to be controlled and the CPU contained system LSI 100 via a CPUb address bus 211 and a CPUb data bus 212. Further, the CPUb 200 respectively accesses the CPU contained system LSI 100 and the device b201 to be controlled by two chip select signals CSb0 and CSb1.

The CPUa 101 accesses the ROM 102, the device a 103 to be controlled and the common memory 104 via the bus adjusting circuit 105, a common address bus 111 and a common data bus 112. The ROM 102 stores a processing program of the CPUa 101. The CPUa 101 reads the processing program stored in the ROM 102 to execute a process. The common memory 104 receives accesses from both the CPUs of the CPUa 101 and the CPUb 200. The CPUb 200 controls the CPU contained system LSI 100 via the common memory 104.

The bus adjusting circuit 105 adjusts the accesses from both the CPUs of the CPUa 101 and the CPUb 200 to access the ROM 102, the device a 103 to be controlled and the common memory 104 via the common address bus 111 and the common data bus 112.

At this time, the bus adjusting circuit 105 outputs chip select signals CS0, CS1 and CS2 and accesses respectively to the ROM 102, the device a 103 to be controlled and the common memory 104 mapped on specific addresses in accordance with addresses designated in the accesses from the CPUa 100 and the CPUb 200.

Figure 2:
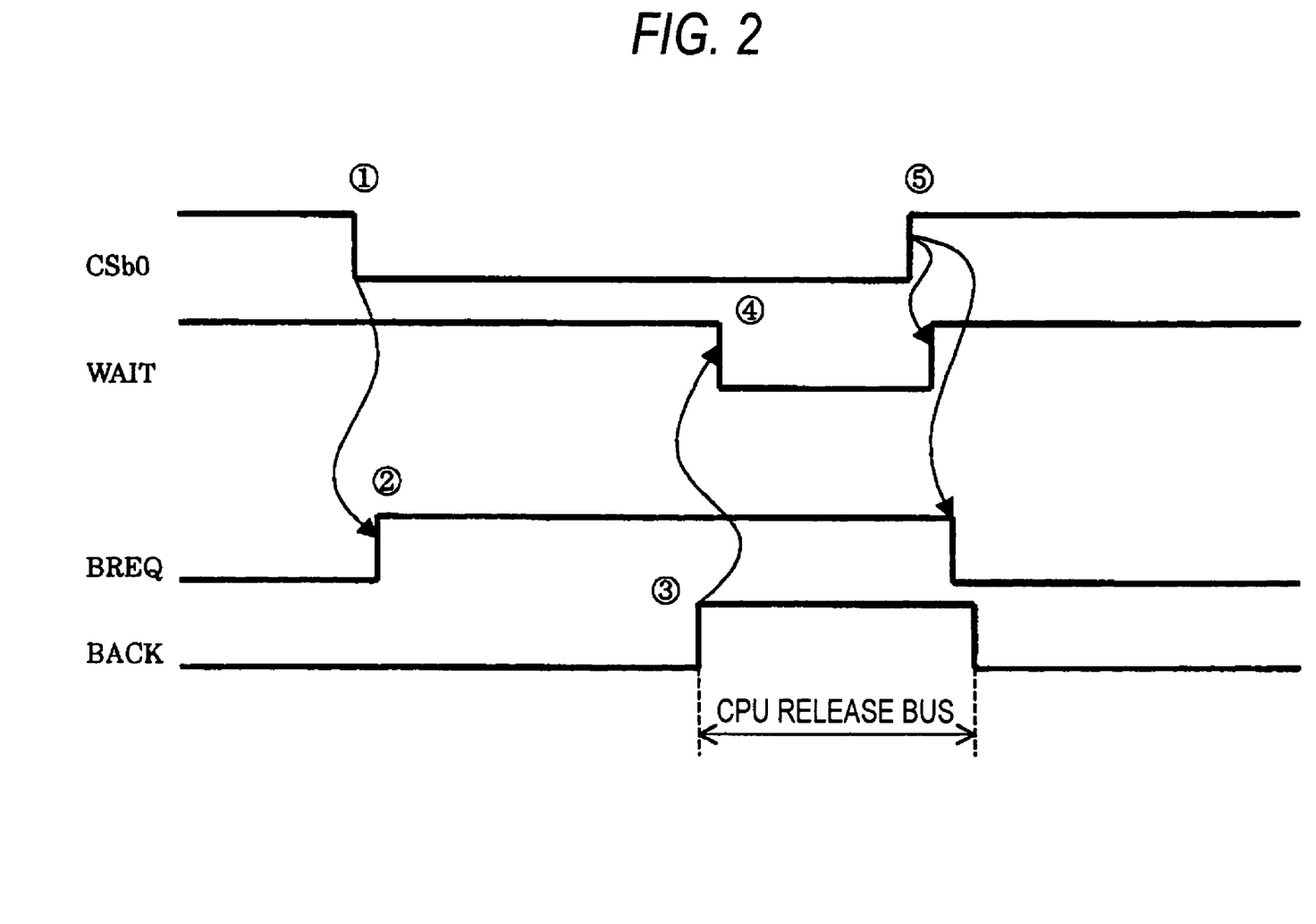
FIG. 2 is a timing chart for explaining a control operation in an access to a common memory.

FIG. 2 is a timing chart for explaining a control operation in the access to the common memory 104 from the CPUb 200. Now, referring to FIGS. 1 and 2, the operation when the CPUb 200 accesses the common memory 104 is described below.

(1) When the CPUb 200 does not access the common memory 104, a WAIT signal is set to "H". In order to access the common memory 104, the CPUb 200 asserts the CSb0 to "L" (1 in FIG. 2).

(2) The bus adjusting circuit 105 detects the "L" polarity of the CSb0 to assert a bus release request signal BREQ to "H" for the CPUa 101 (2 in FIG. 2). At this time, the WAIT signal remains in "H" and the CPUb 200 is kept waiting. In a waiting state, the bus adjusting circuit 105 does not output an address input from the CPUb address bus 211 to the common address bus 111.

(3) The CPUa 101 receives the BREQ signal to stop the access to the common bus and release the common bus for the CPUb. When the release is completed, the CPUa 101 asserts a bus release completion signal BACK to "H" (3 in FIG. 2).

(4) When the bus adjusting circuit 105 recognizes the BACK signal, the bus adjusting circuit 105 outputs the address input from the CPUb address bus 211 to the common address bus 111 to execute the access from the CPUb 200, assert the WAIT signal to "L" and release the wait state of the CPUb 200 (4 in FIG. 2).

(5) The CPUb 200 detects the "L" polarity of the WAIT signal to know that the waiting state is released and access the common memory 104. When the CPUb 200 completes the access, the CPUb 200 negates the CSb0 signal (5 in FIG. 2).

(6) When the bus adjusting circuit 105 recognizes the negation of the CSb0 signal, the bus adjusting circuit negates the WAIT signal, negates the BREQ signal and returns a right for using the bus to the CPUa 101. When the right for using the bus is returned to the CPUa 101, the CPUa 101 negates the BACK signal.

In parallel with the above-described operations, the CPUa 101 and the CPUb 200 mutually control interruptions by using interrupt signals IRQ0 and IRQ1. For instance, the CPUa 101 or the CPUb 200 stops an access to the common bus in accordance with an interruption. The interrupt signal IRQ will be more specifically described below.

While the CPUb 200 accesses the common memory 104, when the CPUa 101 tries to access the common bus, the access of the CPUa 101 is not permitted, because the BREQ signal is set to "H".

When the CPUb 200 accesses the device b201 to be controlled, the CBS0 signal is not asserted, the CPUa 101 does not need to release the common bus. Thus, the CPUa 101 can continuously read the processing program from the ROM 102 and execute the program.

As described above, the CPUb 200 employs a handshaking function using the WAIT signal so that the CPUb 200 can operate preferentially to the CPUa 101. Thus, particularly when the CPUb 200 governs the control of all the system, the CPUb200 can suppress an influence to the deterioration of the performance of all the system to a minimum.

In the structure shown in FIG. 1, the bus adjusting circuit 105 may have a function for completely stopping the operation of the CPUa 101. When the CPUa 101 is stopped, the bus adjusting circuit 105 can internally fix the BACK signal to "H", so that the bus adjusting circuit 105 can skip the phases of the above-described items (2) and (3) to execute the access from the CPUb 200. Thus, for instance, even in a processing program prepared for a system LSI having no contained CPU, the LSI can be operated by using the CPUb 200, so that the compatibility of the processing program can be improved.

Now, a second embodiment of the present invention will be described. In the second embodiment, a ROM part in a CPU contained system LSI 100 is a RAM. In recent years, software has many potential bugs due to its complication and a processing program used as a ROM includes an extremely high risk.

Thus, in recent years, a nonvolatile memory such as a flash ROM is frequently externally attached to a CPU so that a processing program is stored in the flash ROM so as to be rewritten. Further, since the flash ROM is low in its access speed, the processing speed of the CPU is lowered. Thus, a method may be sometimes used in which the LSI is provided with a RAM contained therein to load the RAM with the processing program from the flash ROM upon booting and operate the CPU by the processing program on the RAM.

However, in the system having a plurality of CPUs as shown in FIG. 1, the provision of the flash ROM for each CPU is not desirable in view of the cost. Thus, in the second embodiment, the CPU contained system LSI 100 is equipped with the RAM for storing a processing program. A CPUb 200 is adapted to be operated by an externally attached flash ROM. The processing programs of both CPUs of a CPUa 101 and a CPUb 200 are stored in one flash ROM. The CPUb 200 is designed to load the RAM with the processing program for the CPUa 101 upon booting.

Figure 3:
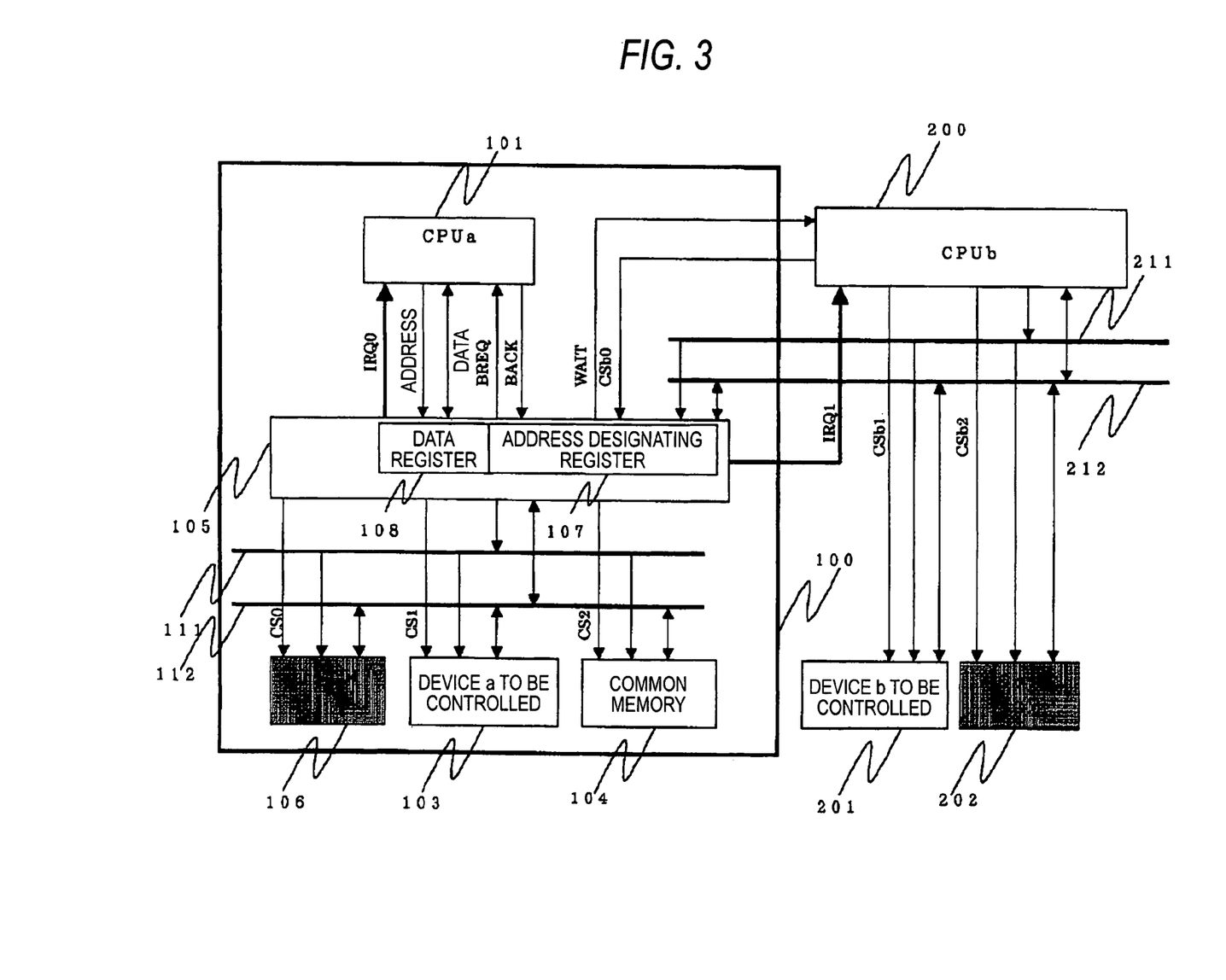
FIG. 3 is a block diagram showing the structure of a system using a CPU contained LSI according to a second embodiment of the present invention.

FIG. 3 is a block diagram showing the structure of a system using the CPU contained LSI according to the second embodiment of the present invention constructed as described above. In FIG. 3, the same components as those of FIG. 1 are designated by the same reference numerals as those of FIG. 1 and the explanation thereof will be omitted. In FIG. 3, a flash ROM 202 controlled by a CPUb is newly prepared. Further, as the RAM for storing the processing program, an IRAM 106 is connected to a common bus instead of the ROM 102.

The CPUb 200 controls three devices including the CPU contained system LSI 100, a device b201 to be controlled and the flash ROM 202 via a CPUb address bus 211 and a CPUb data bus 212. At this time, the CPUb 200 accesses respectively the three devices by using three chip select signals CSb0, CSb1 and CSb2.

The flash ROM 202 stores the processing program of the CPUb 200 and the processing program of the CPUa 101. The CPUb 200 reads the processing program stored in the flash ROM 202 to execute a process.

In the IRAM 106, the processing program of the CPUa 101 is stored by the CPUb 200 upon start. The CPUa 101 reads the processing program stored in the IRAM 106 to execute a process.

In a bus adjusting circuit 105, an address designating register 107 and a data register 108 are provided as an access window for reading/writing data in the IRAM 106. When the CPUb 200 accesses the IRAM 106, the CPUb 200 accesses it via the address designating register 107 and the data register 108.

In the second embodiment, an ordinary operation is the same as that of the first embodiment. An operation upon booting as a new function in the second embodiment will be described below.

(1) When a power is turned on, the CPUa 101 does not execute the processing program and waits for information from the CPUb 200.

(2) The CPUb 200 reads the processing program for the CPUb 200 from the flash ROM 202 to start the execution of a process.

(3) The CPUb 200 reads the processing program for the CPUa 101 stored in the flash ROM 202 and writes the processing program in the IRAM 106 via the address designating register 107 and the data register 108 provided in the bus adjusting circuit 105.

(4) Specifically, the CPUb 200 reads the first data of the processing program for the CPUa 101 from the flash ROM 202 to write a first address of the IRAM in the address designating register 107 and write the first data in the data register 108. The bus adjusting circuit 105 writes the data written in the data register 108 in the address of the IRAM written in the address designating register 107.

(5) Then, the CPUb 200 reads next data from the flash ROM 202 to write the address of a previous time of the IRAM+1 in the address designating register 107 and write the next data in the data register 108. The bus adjusting circuit 105 writes the data written in the data register 108 in the address of the IRAM written in the address designating register 107.

(6) The CPUb 200 repeats the operation of (5), so that the CPUb 200 reads the whole processing program for the CPUa 101 and writes the processing program in the IRAM 106.

(7) When the processing program for the CPUa 101 is completely written in the IRAM 106, the CPUb 200 informs the CPUa 101 of a completion of writing.

(8) When the CPUa 101 receives the information of completion from the CPUb 200, the CPUa 101 reads the processing program stored in the IRAM 106 to start the execution of a process.

As described above, the IRAM 106 is loaded with the processing program so that the processing speed of the CPUa 101 can be improved. Further, the flash ROM 202 is shared by the CPUa 101 and the CPUb 200 so that the number of the flash ROMs can be reduced. Accordingly, the cost of all the system can be reduced.

Further, the address designating register 107 and the data register 108 are provided and the CPUb 200 writes the processing program in the IRAM 106 via them. Thus, the CPUb 200 may not designate all the IRAM 106 and designate only the address of the register as an address to be accessed and designated from the CPUb 200. Accordingly, the memory space to be accessed from the CPUb 200 can be reduced. Consequently, the number of terminals of an address bus between the CPU contained system LSI 100 and the CPUb 200 can be reduced.

Further, the address designating register 107 can be incremented every time the data is written in the data register 108. Thus, as described above, when the processing program for the CPUa 101 is written in the continuous addresses of the TRAM 106, the address designating register 107 does not need to be rewritten every time.

Now, a third embodiment of the present invention will be described. The third embodiment concerns a method that a CPUa 101 and a CPUb 200 supplies information to each other by interrupt signals.

Figure 4:
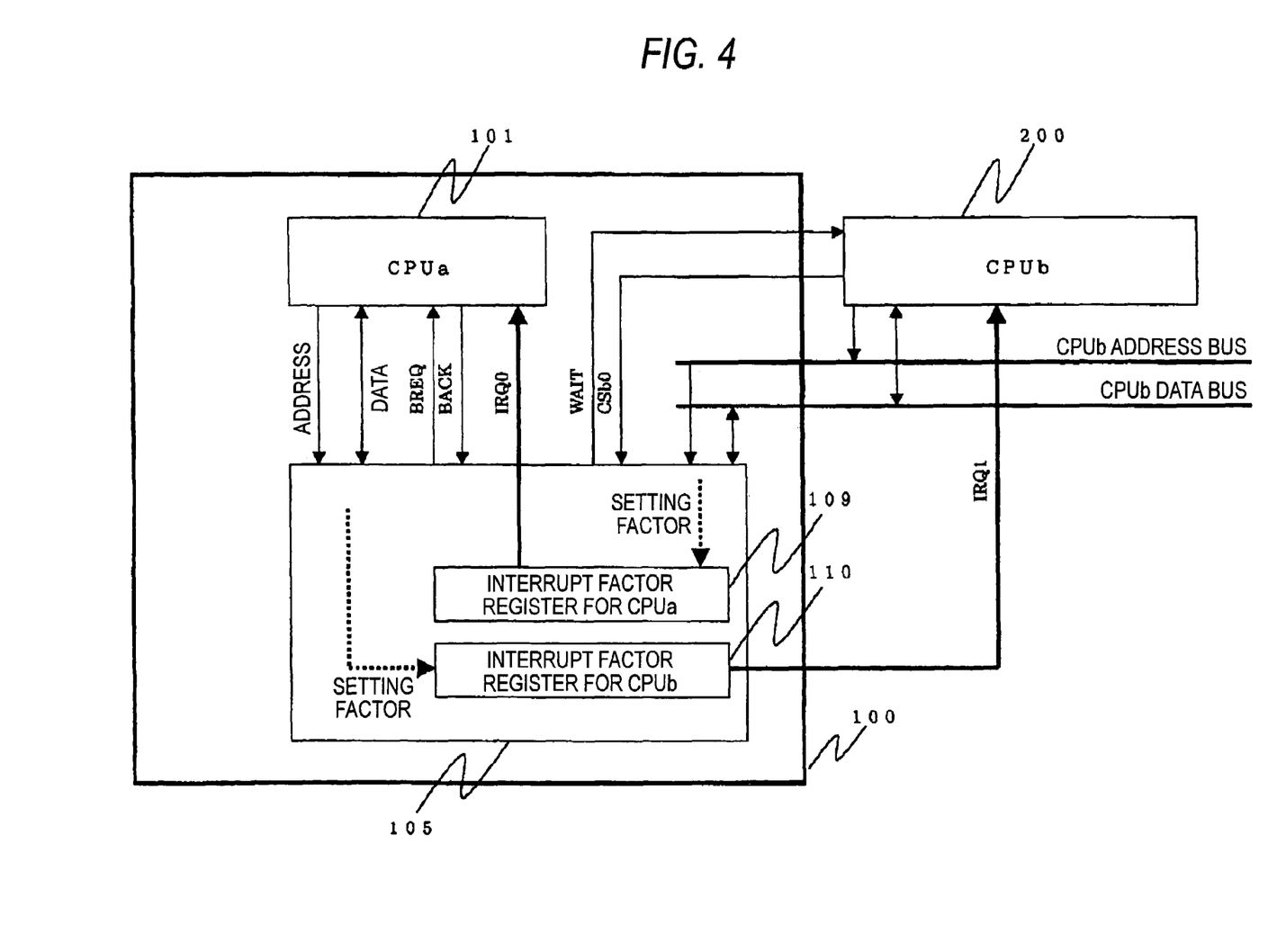
FIG. 4 is a block diagram showing the structure of a system using a CPU contained LSI according to a third embodiment of the present invention

FIG. 4 is a block diagram showing the structure of a system using a CPU contained LSI according to the third embodiment of the present invention. In FIG. 4, the same components as those of FIG. 1 are designated by the same reference numerals as those of FIG. 1 and the explanation thereof will be omitted. Since a common bus, a ROM, a device to be controlled and a common memory do not directly relate to the explanation of the embodiment, the explanation of them is omitted.

Figure 5:
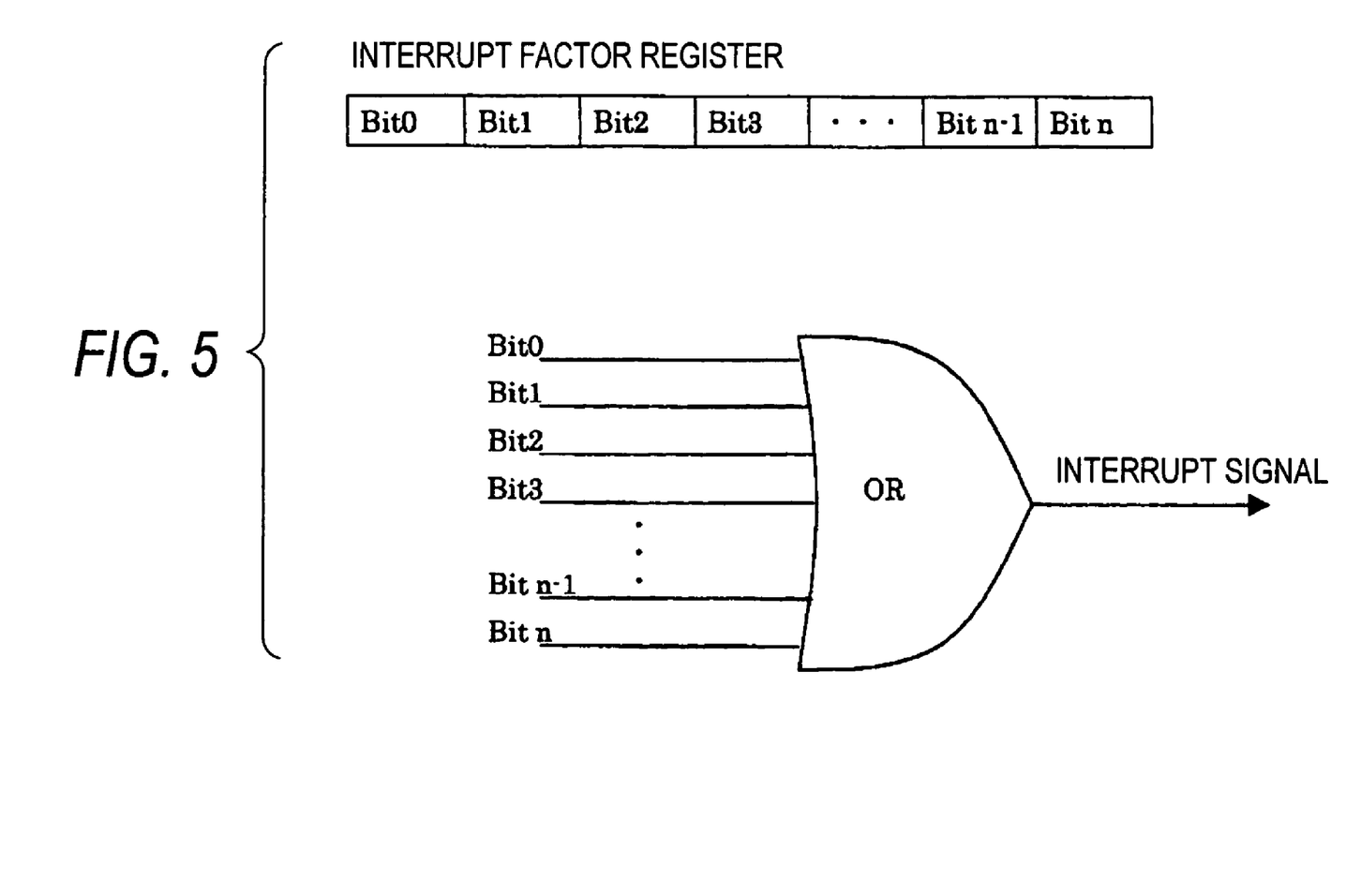
FIG. 5 is a block diagram of an interrupt factor register.

In FIG. 4, a bus adjusting circuit 105 includes an interrupt factor register 109 for a CPUa and an interrupt factor register 110 for a CPUb. The interrupt factor register 109 for a CPUa and the interrupt factor register 110 for a CPUb respectively have the structures of registers composed of n bits as shown in FIG. 5. The ORs of all bits are respectively asserted as interrupt signals IRQ0 and IRQ1 in FIG. 4.

Specifically, when "1" is written in any bit of either of the interrupt factor registers, a corresponding interrupt signal IRQ0 or IRA1 is asserted. The interrupt factor register 109 for a CPUa or the interrupt factor register 110 for a CPUb has a structure that a programmer can freely allocate a bit without fixing each bit to a specific interrupt factor.

As the contents of information due to an interrupt from the CPUa 101 to the CPUb 200 or from the CPUb 200 to the CPUa 101, various kinds of information may be considered. For example, the information may be used as information of completion of writing in a common memory 104 or information of completion of writing a processing program in an IRAM in FIG. 2. Otherwise, many contents of information may be considered to exist depending on the contents of the processing programs. In this embodiment, the interrupt factor registers are provided, so that the programmer can freely allocate the bit to the interrupt factor to improve the degree of freedom of the processing program.

Here, as an operation example, a flow of a process in which the CPUa 101 employs the interrupt factor register 110 for a CPUb to inform the CPUb 200 of an interruption will be described by referring to FIG. 4.

(1) The CPUa 101 writes "1" to a bit 0 of the interrupt factor register 110 for a CPUb.

(2) Since the OR of all bits of the interrupt factor register 110 for a CPUb becomes "1", the bus adjusting circuit 105 asserts the interrupt signal IRQ1.

(3) When the interrupt signal IRQ1 is asserted, the CPUb 200 receives the interruption and reads the interrupt factor register 110 for a CPUb to recognize that an interrupt factor designated by the bit 1 is informed.

(4) The CPUb 200 writes "0" to the bit 1 of the interrupt factor register 110 for a CPUb to clear the bit 1.

The present invention is not limited to the above-described embodiments 1 to 3. For instance, in the above-described embodiments, although the examples having two CPUs are described, the same effects can be obtained by two or more CPUs. It does not matter whether the common bus of the CPUa is externally expanded or not in the present invention. Further, it is to be understood that it does not matter to which state "H" and "L" of a signal is allotted.

Further, in a multi-CPU system LSI having a plurality of CPUs in one chip, a bus is divided into a plurality of buses and a bus adjusting circuit of the present invention is provided, so that the plural CPUs can respectively control devices connected to the plural buses. Accordingly, the processing efficiency of the multi-CPU system can be improved.

As described above, according to the present invention, in an environment in which the CPU contained in the system LSI and the external CPU share the bus, the bus adjusting circuit is provided in the CPU contained system LSI. Thus, the common bus in the CPU contained system LSI is separated from the external expansion bus to which the external CPU is connected. Even when the external CPU accesses the device to be controlled, the contained CPU can access the ROM device connected to the common bus to read and execute the processing program and avoid the deterioration of a performance of the contained CPU. Accordingly, excellent effects can be obtained.

Further, according to the present invention, the bus adjusting circuit has not only the adjusting control function using the bus release request signal and the bus release completion signal, but also the adjusting function using the chip select signal and the wait signal. Thus, when the external CPU does not include the bus adjusting function, a bus adjustment can be realized. Further, the handshaking function using the wait signal is used so that the external CPU can be preferentially operated and an influence applied to the deterioration of a performance of the system controlled by the external CPU can be suppressed to a minimum.

Further, according to the present invention, the CPU contained system LSI has a RAM for the contained CPU. The RAM is loaded with the processing program from the external CPU so that an inexpensive system can be realized by avoiding a risk that the processing program becomes a ROM.

Further, according to the present invention, the bus adjusting circuit has the interrupt factor register in which the allocation and setting of the bit of the interrupt factor can be programmed. Accordingly, the factors of the interrupt information between the contained CPU and the external CPU can be installed so as to be programmable.

What is claimed is:

1. A CPU contained LSI comprising:
   a contained CPU;
   a first bus connected to the contained CPU;
   a second bus connected to an external CPU; and
   a bus adjusting circuit disposed between the first bus and the second bus to exclusively control accesses of the external CPU and the contained CPU to a device connected to the first bus;
   wherein the bus adjusting circuit is provided with an interrupt control circuit for informing of an interruption between the contained CPU and the external CPU; the interrupt control circuit includes an interrupt factor register having a plurality of bits in which the allocation and setting of bits of an interrupt factor are programmable and a circuit for outputting an interrupt signal;

wherein, when a chip select signal and an address to access the device connected to the first bus from the external CPU are inputted during an access to the device connected to the first bus by the contained CPU, the bus adjusting circuit inputs the address to the first bus from the second bus by releasing a wait signal to permit the external CPU to access the device connected to the first bus and connecting the second bus to the first bus after stopping the access of the contained CPU to the first bus.

2. A CPU contained LSI according to claim 1, wherein when the chip select signal and the address to access the device connected to the first bus from the external CPU are inputted during an access to the device connected to the first bus by the contained CPU, the bus adjusting circuit transmits a bus release request signal to the contained CPU, and when the bus adjusting circuit receives a bus release completion signal from the contained CPU, the bus adjusting circuit releases the wait signal to permit the external CPU to access the device connected to the first bus.

3. A CPU contained LSI according to claim 2, wherein when a stop of the operation of the contained CPU is set, the bus adjusting circuit permits the external CPU to access the device connected to the first bus without transmitting the bus release request signal to the contained CPU.

4. A CPU contained LSI according to claim 1, wherein a common memory connected to the first bus is provided.

5. A CPU contained LSI according to claim 1, wherein a memory device connected to the first bus is provided for storing a program for operating the CPU contained LSI.

6. A CPU contained LSI according to claim 5, wherein the memory device connected to the first bus is a RAM and when the CPU contained LSI is started, the external CPU loads the RAM with a program for operating the contained CPU from an external memory connected to the second bus.

7. A CPU contained LSI according to claim 6, wherein the bus adjusting circuit includes a writing address register and a writing data register, and when the external CPU loads the RAM with the program for operating the contained CPU, the external CPU sets the address of the RAM to the writing address register and writes data to be written in the RAM in the writing data register.

8. A CPU contained LSI according to claim 7, wherein the writing address register is incremented every time data is written in the writing data register.

* * * * *